US008726020B2

(12) United States Patent
Warman et al.

(10) Patent No.: US 8,726,020 B2
(45) Date of Patent: May 13, 2014

(54) UPDATING CONFIGURATION INFORMATION TO A PERIMETER NETWORK

(75) Inventors: Leon Warman, Kirkland, WA (US); Malcolm E. Pearson, Kirkland, WA (US); Andrei Kuznetsov, Redmond, WA (US); Nathan F. Waddoups, Redmond, WA (US); Eric D. Tribble, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 2216 days.

(21) Appl. No.: 11/421,408

(22) Filed: May 31, 2006

(65) Prior Publication Data

US 2007/0283148 A1 Dec. 6, 2007

(51) Int. Cl.
*H04L 9/32* (2006.01)

(52) U.S. Cl.
USPC .......................................... 713/168; 709/223

(58) Field of Classification Search
USPC .................. 713/165–168, 188, 189; 709/223; 726/4–6
See application file for complete search history.

(56) References Cited

U.S. PATENT DOCUMENTS

| | | | |
|---|---|---|---|
| 5,418,854 A | 5/1995 | Kaufman et al. | |
| 5,577,209 A | 11/1996 | Boyle et al. | |
| 5,737,419 A | 4/1998 | Ganesan | |
| 5,872,930 A | 2/1999 | Masters et al. | |
| 5,968,176 A | 10/1999 | Nessett et al. | |
| 6,041,347 A | 3/2000 | Harsham et al. | |
| 6,138,159 A | 10/2000 | Phaal | |
| 6,243,815 B1 | 6/2001 | Antur et al. | |
| 6,678,828 B1 | 1/2004 | Pham et al. | |
| 6,701,358 B1 | 3/2004 | Poisson et al. | |
| 6,708,187 B1 | 3/2004 | Shanumgam et al. | |
| 6,816,970 B2 | 11/2004 | Morgan et al. | |
| 6,834,299 B1 | 12/2004 | Hamilton, II et al. | |
| 6,931,532 B1 | 8/2005 | Davis et al. | |
| 6,941,459 B1 | 9/2005 | Hind et al. | |
| 6,944,183 B1 | 9/2005 | Iyer et al. | |

(Continued)

FOREIGN PATENT DOCUMENTS

| | | |
|---|---|---|
| CA | 2 390 817 A1 | 12/2003 |
| EP | 1 143 665 A2 | 10/2001 |

(Continued)

OTHER PUBLICATIONS

Isode, Using Active Directory as part of a distributed directory, http://www.isode.com/whitepapers/active-directory.html, Whitepapers, 2006, 3 pp., United States.

(Continued)

*Primary Examiner* — Farid Homayounmehr
*Assistant Examiner* — Suman Debnath
(74) *Attorney, Agent, or Firm* — Senniger Powers LLP

(57) ABSTRACT

Automatically sending configuration information from a trusted network to a perimeter network. Master servers residing in the trusted network are adapted for administering a distributed directory service containing configuration information. Edge servers residing in the perimeter network are adapted for using a local directory service local to each edge server. Edge-connected bridgehead servers residing in the trusted network are adapted for replicating the configuration information from the trusted network to the perimeter network. Replicating the configuration information to the perimeter network by trusted servers acquiring leases on edge servers is also disclosed.

16 Claims, 6 Drawing Sheets

(56) References Cited

U.S. PATENT DOCUMENTS

| | | |
|---|---|---|
| 6,961,849 B1 | 11/2005 | Davis et al. |
| 6,978,367 B1 | 12/2005 | Hind et al. |
| 7,155,723 B2 | 12/2006 | Swildens et al. |
| 7,181,017 B1 | 2/2007 | Nagel et al. |
| 7,340,438 B2 | 3/2008 | Nordman et al. |
| 7,466,694 B2 | 12/2008 | Xu et al. |
| 7,496,628 B2 | 2/2009 | Arnold et al. |
| 7,522,908 B2 | 4/2009 | Hrastar |
| 7,590,736 B2 | 9/2009 | Hydrie et al. |
| 7,613,659 B1 | 11/2009 | Hoffman et al. |
| 2002/0048369 A1 | 4/2002 | Ginter et al. |
| 2002/0078351 A1 | 6/2002 | Garib |
| 2002/0099823 A1 | 7/2002 | Jemes et al. |
| 2003/0028580 A1 | 2/2003 | Kucherawy |
| 2003/0050911 A1 | 3/2003 | Lucovsky et al. |
| 2003/0059030 A1 | 3/2003 | Tenorio |
| 2003/0149888 A1 | 8/2003 | Yadav |
| 2004/0059789 A1 | 3/2004 | Shum |
| 2004/0087311 A1 | 5/2004 | Haglund |
| 2004/0109518 A1 | 6/2004 | Miller et al. |
| 2004/0162880 A1 | 8/2004 | Arnone et al. |
| 2004/0243699 A1 | 12/2004 | Koclanes et al. |
| 2004/0260778 A1 | 12/2004 | Banister et al. |
| 2005/0055578 A1 | 3/2005 | Wright et al. |
| 2005/0125689 A1 | 6/2005 | Snyder |
| 2005/0228867 A1 | 10/2005 | Osborne et al. |
| 2006/0041761 A1* | 2/2006 | Neumann et al. ............. 713/189 |
| 2006/0053262 A1 | 3/2006 | Prahlad et al. |
| 2006/0053263 A1 | 3/2006 | Prahlad et al. |
| 2006/0095569 A1 | 5/2006 | O'Sullivan |
| 2006/0106938 A1 | 5/2006 | Dini et al. |
| 2006/0182034 A1 | 8/2006 | Klinker et al. |
| 2006/0190243 A1* | 8/2006 | Barkai et al. ...................... 704/8 |
| 2007/0055789 A1 | 3/2007 | Claise et al. |
| 2007/0088822 A1 | 4/2007 | Coile et al. |
| 2007/0100701 A1 | 5/2007 | Boccon-Gibod et al. |
| 2007/0177731 A1 | 8/2007 | Spies et al. |
| 2007/0206762 A1 | 9/2007 | Chandra et al. |
| 2008/0060080 A1 | 3/2008 | Lim |
| 2010/0121932 A1 | 5/2010 | Joshi et al. |

FOREIGN PATENT DOCUMENTS

| | | |
|---|---|---|
| EP | 1143665 B1 | 10/2001 |
| WO | 00/07355 A2 | 2/2000 |
| WO | 0127772 A1 | 4/2001 |

OTHER PUBLICATIONS

Riley, Steve, Active Directory Replication Over Firewalls, http://www.microsoft.com/technet/prodtechnol/windows2000serv/technologies/activedirectory/deploy/confeat/adrepfir.mspx, Jan. 31, 2006, 9 pp., Microsoft TechNet, Microsoft Corporation, United States.

Posey, Brien M., Troubleshooting Active Directory replication problems, http://techrepublic.com.com/5100-22_11-5443301.html#, Nov. 8, 2004, 8 pp., CNET Networks, Inc.

Cuervo, F. et al., "Prime Time for Policy-Based Management", Alcatel Telecommunications Review, Alcatel, Paris Cedex, FR, Jul. 2003, XP007005947, ISSN: 1267-7167, 9 pgs.

Sun Microsystems, Chapter 5 Deployment Design, Online, Feb. 2005, Retrieved Jul. 2009, http://web.archive.org/web20050219003745/http://docs.sun.com/source/819-0058/dep_archetect.html, pp. 1-22.

* cited by examiner

UPDATING CONFIGURATION INFORMATION TO A PERIMETER NETWORK

BACKGROUND

Large networks are often organized to enhance security from outside attack. A common architecture for such a network includes a perimeter network, or DMZ (i.e., demilitarized zone), that surrounds a trusted network and acts as a buffer between the trusted network and the broader (e.g., global) computing network. These perimeter networks are utilized as a first line of defense against attack from entities residing in the broader network. As a first line of defense, devices and data stored upon the perimeter network are assumed to be at greater risk of attack. Thus, network designers carefully consider what data is placed on devices residing in such perimeter networks. For example, a common task for servers placed on a perimeter network is the routing of e-mails to users within the trusted network. To perform such routing functions, these servers need some information related to the users on the trusted network. Such data is readily available on the trusted network, such as through a distributed directory service containing configuration information (e.g., Microsoft Windows® Active Directory for Windows Server 2003). But because of the increased vulnerability of the perimeter network servers to attack, it is advantageous to limit the quantity and type of data replicated from the distributed directory service on the trusted network and placed upon the perimeter network servers. For the e-mail routing example, e-mail addresses may be stored on servers in the perimeter network, while other information about users is stored on the distributed directory service of the trusted network.

Propagating such data from the distributed directory service on the trusted network to servers on the perimeter network is performed manually by some systems because the security mechanisms between the trusted network and the perimeter network are configured differently and do not allow such communications. In many cases, an administrator will physically transport such data from a trusted network computer to a perimeter network computer with a portable memory device. This process is time-consuming, slow, poses other security risks, and is generally undesirable. A system for automatically sending configuration information from the trusted network to the perimeter network would be useful.

For such a system to function robustly, servers located on the trusted network should communicate readily with servers on the perimeter network. For example, a particular trusted network server could be assigned to service one or more perimeter network servers. Such a system, however, would be susceptible to inoperativeness if one or more of the trusted network servers or perimeter network servers become non-functional. For example, if the trusted network server becomes non-functional (e.g., for servicing), the network server can no longer send updated configuration information to the served perimeter servers. Moreover, changes in the status of one or more of the servers on the perimeter network should be addressed. In these situations, communication paths may become unusable. For each of these situations, therefore, a system that is capable of adapting to particular computing devices becoming unavailable by utilizing other devices for communication would be useful.

SUMMARY

The following simplified summary provides a basic overview of some aspects of the present technology. This summary is not an extensive overview. It is not intended to identify key or critical elements or to delineate the scope of this technology. This Summary is not intended to be used as an aid in determining the scope of the claimed subject matter. Its purpose is to present some simplified concepts related to the technology before the more detailed description presented below.

Accordingly, aspects of embodiments of the invention provide for sending information from a trusted network to a perimeter network automatically. By sending information automatically, aspects of embodiments of the invention permit regular transfer of information from the trusted network to the perimeter network without manual intervention. Moreover, by establishing communication paths automatically, the system adapts to changes in the status of components of the system.

BRIEF DESCRIPTION OF THE DRAWINGS

Corresponding reference characters indicate corresponding parts throughout the drawings.

DETAILED DESCRIPTION

Figure 1:
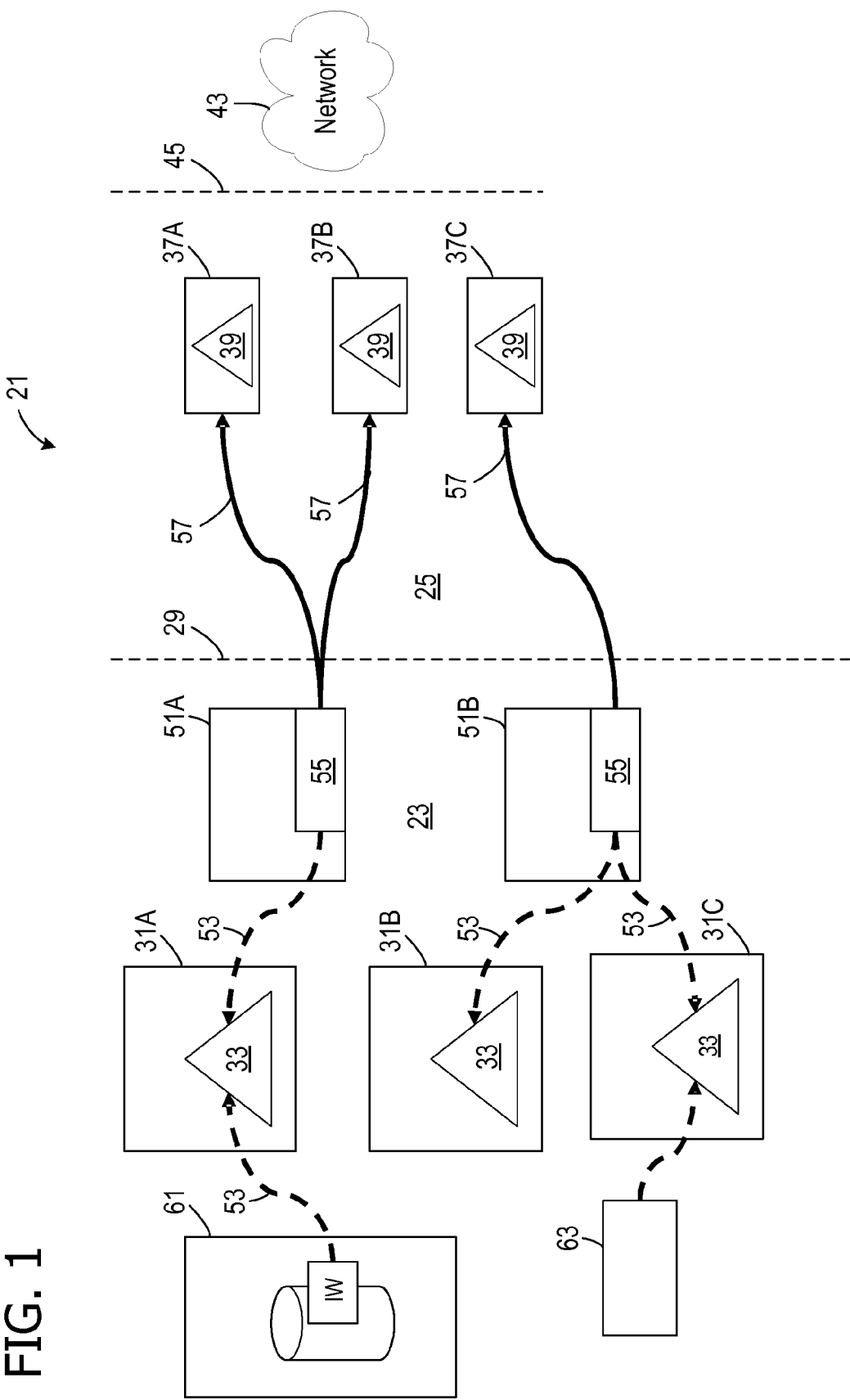
FIG. 1 is a diagram of a system of one embodiment of the invention.

Referring now to FIG. 1, a system, generally indicated 21, for automatically sending configuration information from a trusted network 23 to a perimeter network 25 outside the trusted network, such as for sending electronic mail messages outside the trusted and perimeter networks. The trusted network 23 exists, for example, behind an interior firewall 29 separating the perimeter network 25 and the trusted network 23. In one exemplary embodiment, the trusted network 23 is a corporate network, and the perimeter network 25 protects the corporate network from inappropriate external access.

The system 21 comprises one or more master servers 31, or domain controllers, residing in the trusted network 23. The master servers 31 are adapted for administering a distributed directory service 33 containing configuration information related to the trusted network 23. As used herein, for example, the configuration information can include system configuration data, recipient data, and/or routing data, among others. Each of the master servers 31 adapted for administering the distributed directory service 33 contains the same configuration information related to the trusted network 23. In one example, the distributed directory service 33 is Microsoft Windows® Active Directory for Windows Server 2003, although the master servers may administer other alternative distributed directory services without departing from the scope of embodiments of the invention. When administering such a distributed directory service 33 on a trusted network 23, an administrator accessing any of the master servers 31 may add to, delete from, or modify the configuration information stored on the accessed master server. The distributed directory service 33 is responsible for updating the configuration information on the other master servers 31 according to the additions, deletions, or modifications resulting from the actions of the administrator. In the examples described herein, such updates execute asynchronously, but may also be executed synchronously or by some other timing scheme without departing from the scope of the present invention.

The system 21 also comprises one or more edge servers 37, or gateway servers, residing in the perimeter network 25 outside the trusted network 23. Each of the edge servers 37 is adapted for using a local directory service 39 local to that edge server. In one example, the local directory service 93 is Microsoft Active Directory Application Mode for Windows Server 2003, although the edge servers may use other alternative local directory services without departing from the scope of embodiments of the invention. The one or more edge servers 37 are adapted for communicating with a network 43 (e.g., the Internet) outside the perimeter network 25. In the example shown, an exterior firewall 45 separates the one or more edge servers 37 residing in the perimeter network 25 from the network 43 outside the perimeter network. Any of a variety of alternative firewall applications and other additional or alternative security measures may be utilized without departing from the scope of the embodiments of the invention. In other words, as described herein, each edge server 37 is a message transfer agent (MTA) as understood in the common terminology of a Simple Mail Transfer Protocol (SMTP) or an X Series network protocol (e.g., X.400). Other protocols are also readily applicable without departing from the scope of the present invention.

The system 21 further comprises one or more edge-connected bridgehead servers 51 residing in the trusted network 23 and adapted for communicating with the one or more master servers 31. The edge-connected bridgehead servers 51 communicate with the master servers 31 to obtain configuration information stored in the distributed directory service 33. In the example shown, the edge-connected bridgehead servers 51 utilize trusted network 23 LDAP 53 (Lightweight Directory Access Protocol) to communicate with the master servers 31, although other alternative protocols may be utilized without departing from the scope of embodiments of the invention. The use of LDAP, or other known protocols, is beneficial because its use requires no additional software on the communicating server. In the example shown, a first edge-connected bridgehead server 51A communicates with a first master server 31A, while the second edge-connected bridgehead server 51B communicates with a second master server 31B and a third master server 31C. As would be readily understood by one skilled in the art, an edge-connected bridgehead server 51 can communicate with one or more master servers 31 separately or in combination without departing from the scope of embodiments of the invention. Moreover, one skilled in the art will also recognize that one or more master servers 31 in the trusted network 23 may be assigned to function as bridgehead servers 51.

The edge-connected bridgehead servers 51 are adapted for replicating the configuration information from the distributed directory service 33 administered by the one or more master servers 31 within the trusted network 23 to the local directory service 39 used locally by the one or more edge servers 37 within the perimeter network 25. The configuration information is replicated from the edge-connected bridgehead servers 51 to the edge servers 37 using LDAP 57 through internal firewall 29, although other protocols and languages (e.g., Hypertext Transfer Protocol (HTTP), extensible markup language (XML), etc.) may be utilized without departing from the scope of embodiments of the invention. The use of LDAP, or other known protocols, is beneficial because its use requires no additional software on the communicating server.

In one example, the edge-connected bridgehead servers 51 execute a replication application 55 for performing such replication of configuration information to the local directory service 39 used locally by the one or more edge servers 37. The replication application 55 can perform several functions, including (i) scheduling the interaction between the distributed directory service 33 on the master server 31 and the local directory service 39 on the edge server, (ii) replication of configuration information to the perimeter network 25 via LDAP (discussed below), (iii) determining the topology of the components of the system 21 (discussed below), (iv) locking particular edge servers 37 from use, among others. Other alternative functions may also be performed without departing from the scope of embodiments of the invention. Moreover, in the example shown, the first edge-connected bridgehead server 51A communicates with both a first edge server 37A and a second edge server 37B, while the second edge-connected bridgehead server 51B communicates with a third edge server 37C. As would be readily understood by one skilled in the art, an edge-connected bridgehead server 51 can communicate with one or more edge servers 37 without departing from the scope of embodiments of the invention. Other alternative configurations are also contemplated.

In one example, the one or more edge-connected bridgehead servers 51 are adapted to automatically establish communication with one of the one or more edge servers 37 residing in the perimeter network 25 outside the trusted network 23, as discussed below with respect to the methods described herein.

The system 21 may also comprise other components. For example, the system 21 depicted in FIG. 1 includes an exemplary client mailbox 61 for use by an information worker (IW) communicating with one of the master servers 31 via trusted network 23 LDAP 53. In addition, the system 21 includes a bridgehead server 63 communicating with a master server 31, but not functioning as an edge-connected bridgehead server. Other alternative components may be utilized without departing from the scope of embodiments of the invention.

Figure 2:
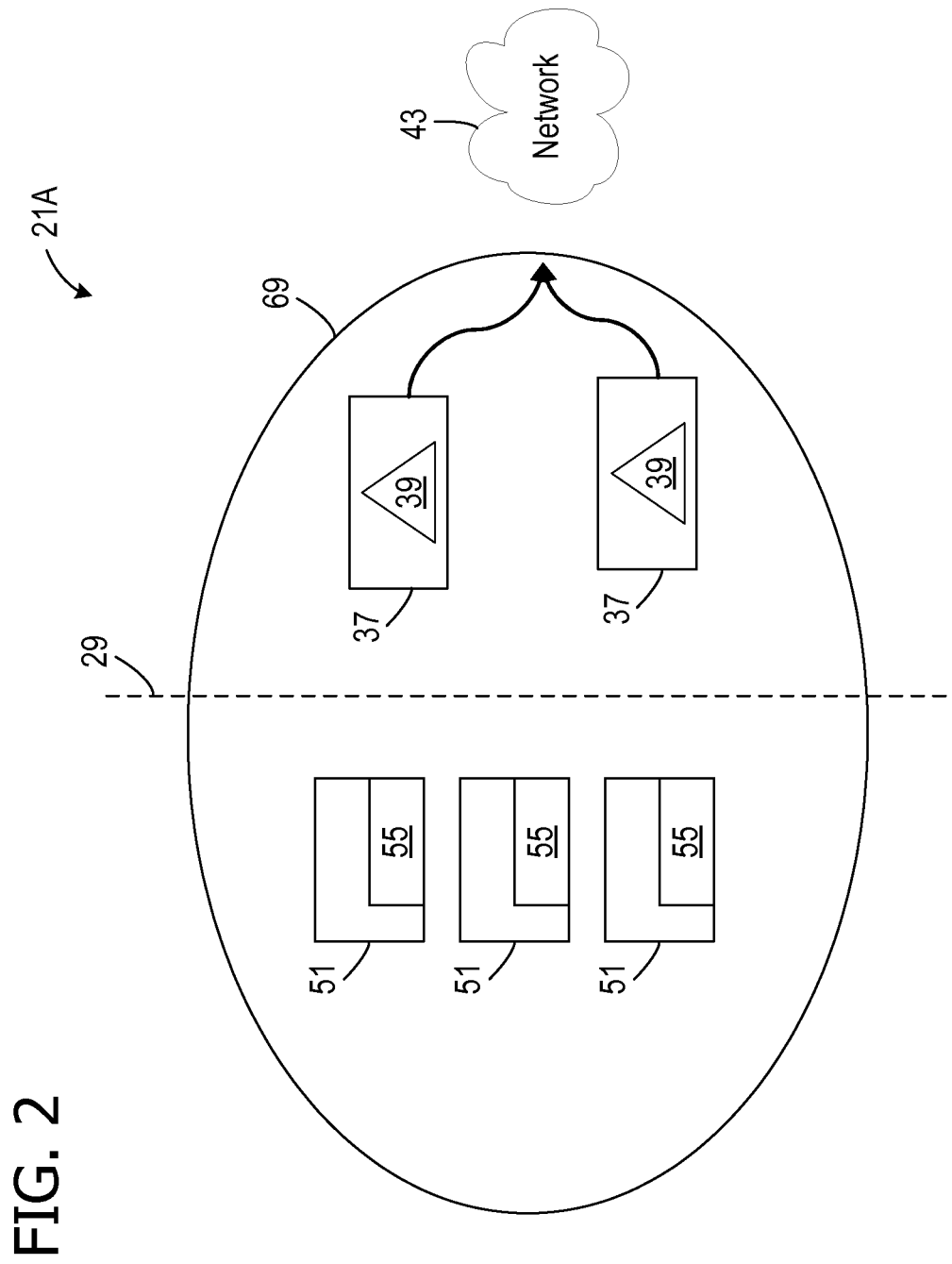
FIGS. 2-4 are diagrams of exemplary system configurations of several embodiments of the invention.
Figure 3:
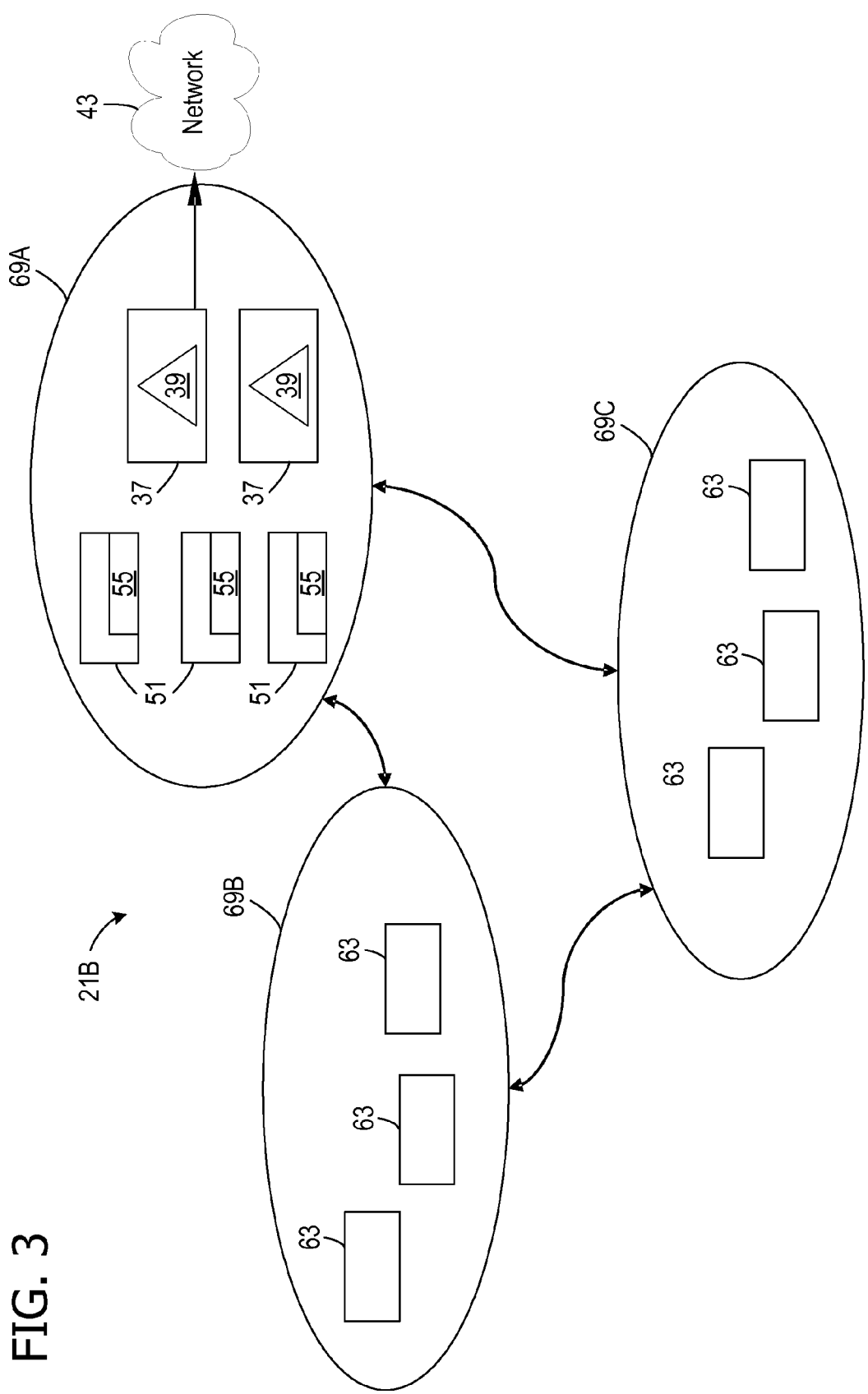
Figure 4:
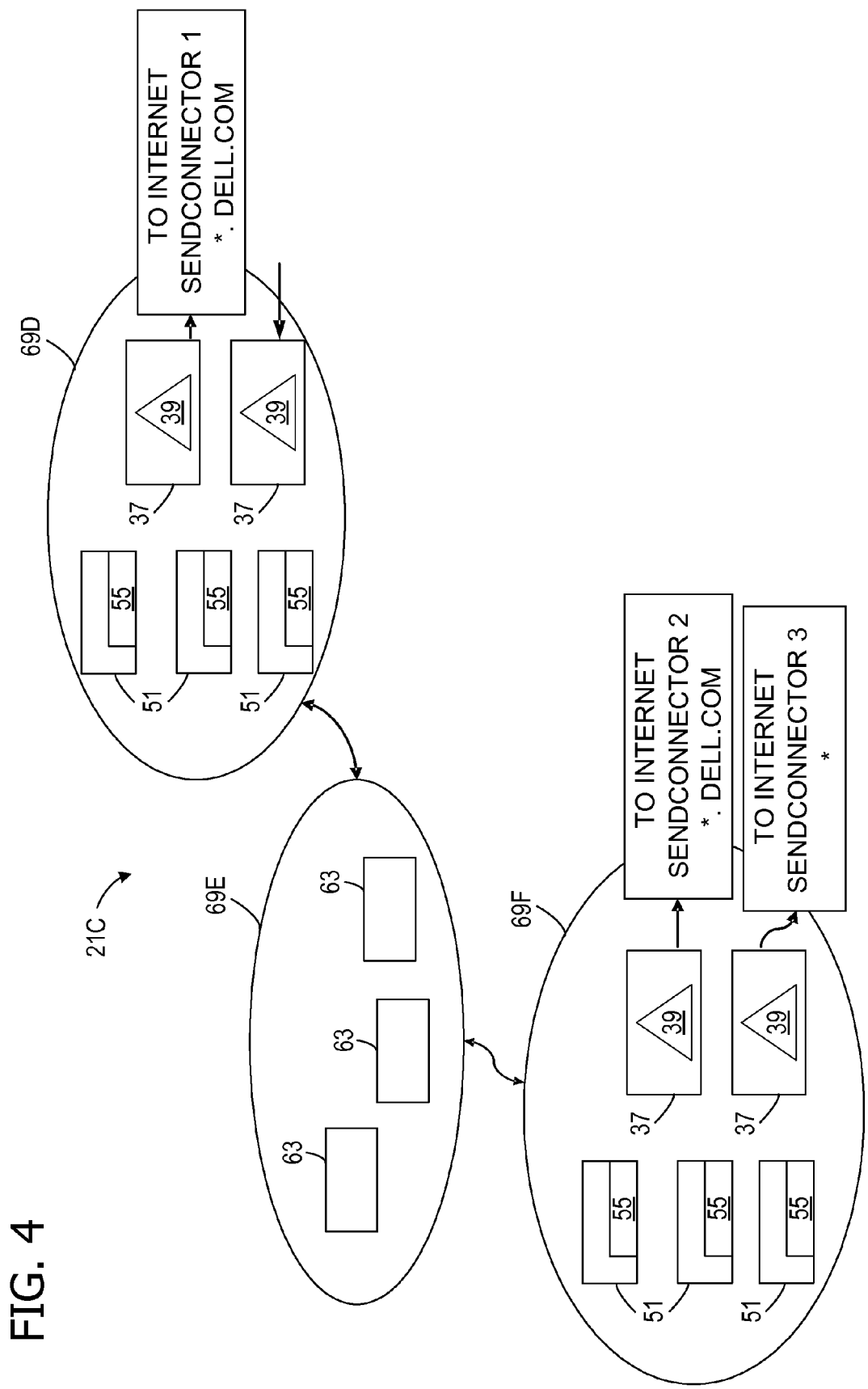

Referring now to FIGS. 2-4, several exemplary system configurations are depicted, demonstrating the ability of systems 21 of embodiments of the present invention to enable common design patterns that are scalable from a single site organization with a single internet connection to a multi-site organization distributed between multiple physical locations and including multiple, direction specific, internet connections. In the example of FIG. 2, a single site 69 comprising three edge-connected bridgehead servers 51 executing a replication application 55 and two edge servers 37 using the local directory service 39 are depicted. In this example, the site 69 defines a substantially local group of the system 21A. For example, the edge-connected bridgehead servers 51 and the two edge servers 37 may be located in substantial physical proximity to one another (e.g., the same physical building, group of buildings, or geographic region). Because the bridgehead servers are each located on the same site 69 as the edge servers 37, all of the bridgehead servers function as edge-connected bridgehead servers 51. As will be discussed in greater detail below with respect to the embodied methods of the invention, each of the edge-connected bridgehead servers 51 is adapted to communicate with each of the edge servers 51. Each of the edge servers 51 is adapted for communicating with a network 43 (e.g., the Internet) outside the perimeter network 25. As would be readily understood by one skilled in the art, mailbox servers are not depicted in the simplified system diagram of FIG. 2, but would exist on such a system 21A as distinct computing devices, or co-resident with the edge-connected bridgehead servers 51. Other components would also be present. On the other hand, fewer components can be included without departing from the scope of the present invention. For example, in a simple case, the trusted network 23 can comprise a single edge-connected bridgehead server 51 and the perimeter network 25 can comprise a single edge server 37.

As an example of the functioning of such a system 21, consider electronic mail routing. Each piece of internal mail generated within the site 69 and directed to the internet is picked up from mailboxes (not shown) by one of the edge-connected bridgehead servers 51 and relayed to the edge servers 37. The edge servers 37 then relay the individual mail to the network 43. External mail generated outside the site 69 and directed to the site is delivered to one of the edge servers 37, which will then relay the mail to one of the three edge-connected bridgehead servers 51. The system can also perform other functions, beyond electronic mail messages, according to the embodiments of the present invention.

Referring now to FIG. 3, an organization defining a system 21B is distributed among three sites 69A, 69B, and 69C (e.g., three offices at different physical locations). In this example, the organization operates its own backbone, such as by either owning the connectivity or constructing the connectivity through a VPN (virtual private network). Moreover, one site 69A comprises two edge servers 37 and three of the edge-connected bridgehead servers 51, while two other sites 69B, 69C comprise only bridgehead servers 63. Connecting to the network 43 is similar to the system 21A of FIG. 2 for users at the site 69A with the edge servers 37. Users at the other sites 69B, 69C connect to the network 43 via the site 69A with the edge servers 37. In such a system 21B, the bridgehead servers 63 have nothing to do with the replication of information to the edge servers 37. In other respects, the system 21B is similar to the previously-described system.

Referring now to FIG. 4, here an organization defines a system 21C that is distributed among three sites 69D, 69E, and 69F (e.g., three offices at different physical locations). In this example, the organization has included send connectors (e.g., network 43 connections) with two of the sites 69D, 69F for accessing the internet. Users at the third site 69E can access the internet via either of the other sites 69D, 69F. Determining which sites will include connections to the internet may be based on several factors, including where the location of the site 69 is close to the target of the connection or because the connectors are physically close to the users generating the mail. In this example, not all connections to the internet are the same. For example, the connection at site 69D connects to a send connector associated with dell.com, whereby one edge server 37 sends such mail into the internet, while the other edge server on the site receives mail. In this manner, a system administrator can readily monitor and administer the workloads of each edge server 37, thereby individually confirming the function of each. Furthermore, the site 69F includes two edge send connectors within a single site for covering different address spaces. Such a configuration may be useful when a large portion of the mail processed comes from a finite number of domains (e.g., one or more domains). Other arrangements of sites 69 and system components may be utilized without departing from the scope of embodiments of the invention.

As would be understood by one skilled in the art, aspects of embodiments of the invention could be applied to various web Information Technology infrastructures beyond those specifically exemplified here.

Figure 5:
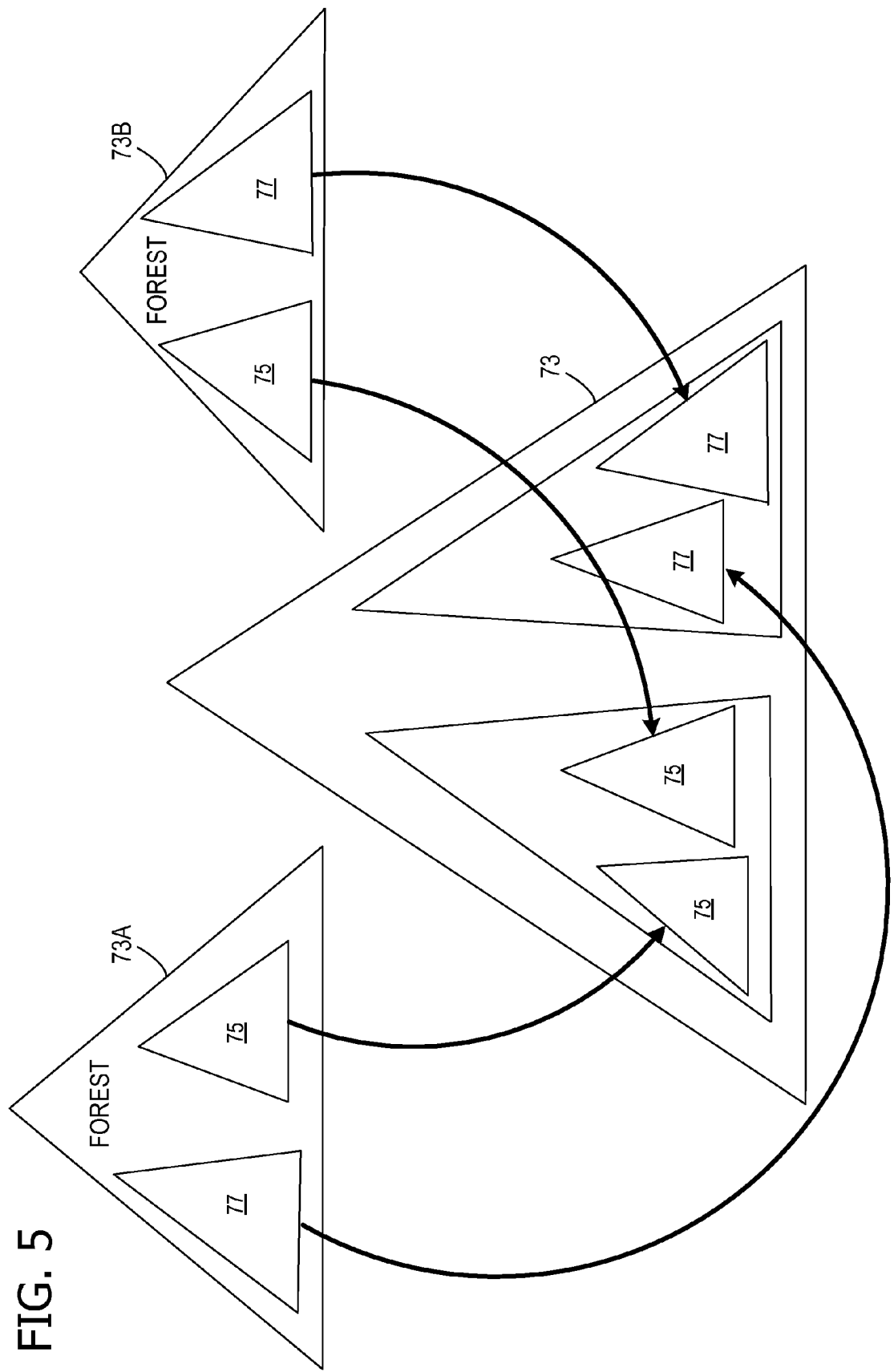
FIG. 5 is a diagram of a system of yet another embodiment of the invention.

Referring now to FIG. 5, a large organization often includes various resources which may be advantageously consolidated into a local directory service 39 used locally by each of a group of edge servers 37, such as discussed above with respect to FIG. 1. Returning to this example, the configuration data may be separately stored in several forests 73A, 73B, or groups, of edge servers 37, and consolidated through the local directory service 39 into a single forest 73 with multiple nodes, or trees. Although the data is fully-replicated in the forest 73, the multiple forest design allows some control over the total amount of replicated data. For example, in FIG. 5, two forests 73A, 73B, each including recipients 75 and exchange configuration information 77, send data to the single forest 73, which consolidates the received data from the multiple forests. The replication application 55 can then perform queries that span the data from the multiple forests 73A, 73B at the common root forest 73 for retrieving the common data.

Figure 6:
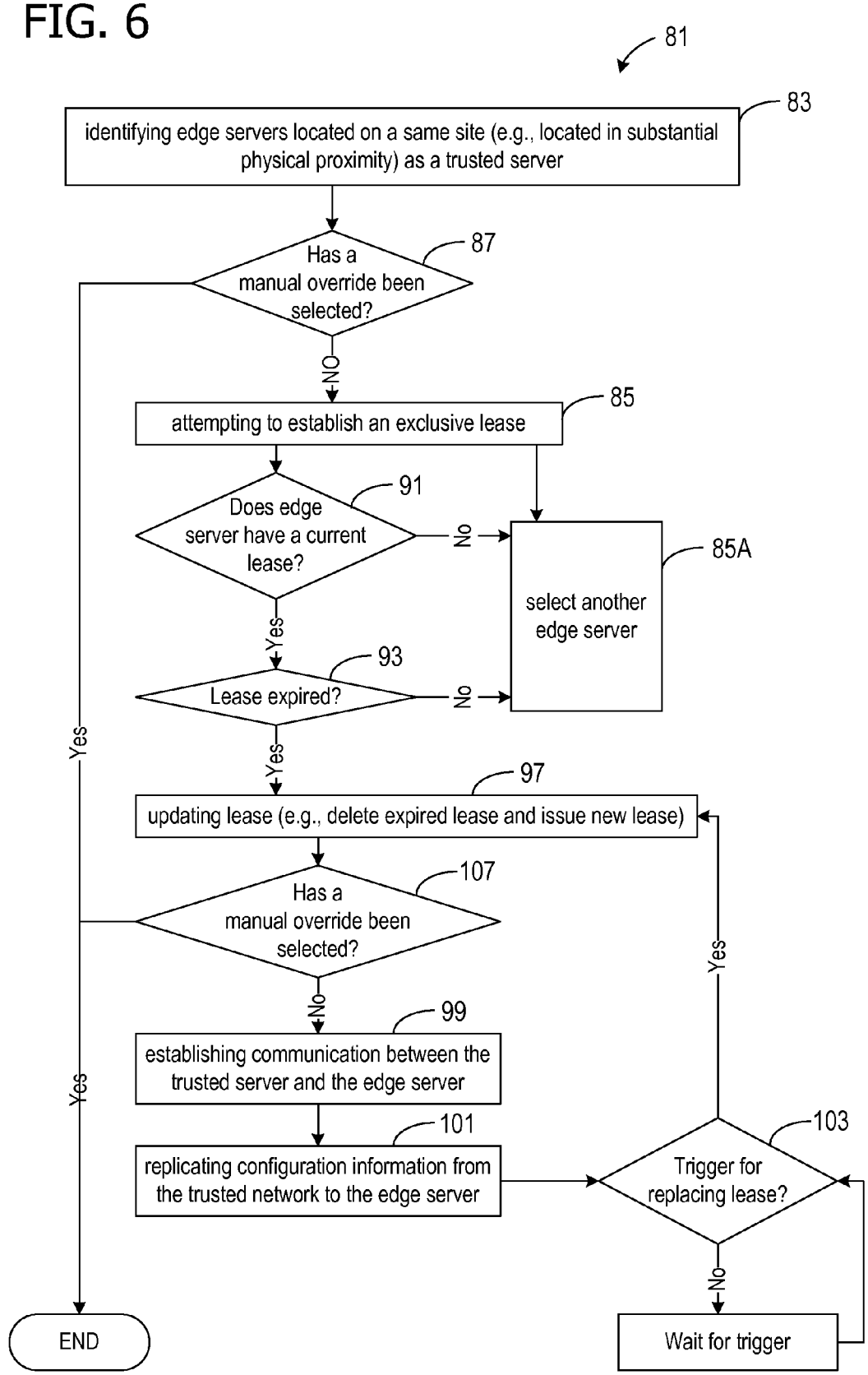
FIG. 6 is a flow diagram of a method of one embodiment of the invention.

An exemplary flow diagram, generally indicated at 81 in FIG. 6, illustrates aspects of a method of automatically establishing communication between a trusted network 23 and a perimeter network 25 outside the trusted network. Beginning at 83, aspects of the invention identify one or more edge servers 37 residing in the perimeter network 25 that are located on a same site 69 as a trusted server 51 (e.g., an edge-connected bridgehead server) residing in the trusted network 23. In one example, the identifying 83 comprises determining which of the edge servers 37 are located in substantial physical proximity to the trusted server 51.

Proceeding to 85, unless a manual override 87 is selected (discussed below), the trusted server 51 attempts to establish an exclusive lease over communication with one of the identified edge servers 37. By establishing an exclusive lease between a trusted server 51 and an edge server 37, embodiments of the invention ensure that different trusted servers do not attempt to send information to the same edge server simultaneously. As used herein, the term "lease" refers to a communication hold placed upon an edge server 37 by a trusted server 51, reserving the right of the trusted server to communicate exclusively with that particular edge server 37 during the period of the hold. Each edge server 37 may only be subject to one lease at a time. In one exemplary embodiment, each edge server 37 includes a data storage location for recording any lease, if one exists. In this manner, other trusted servers may determine the status of each of the edge servers 37 by looking in this data storage location and checking for a data string, or other indicator, indicating that a lease is exists. An exemplary lease includes the name of the trusted server 51 and the time the lease expires (e.g., "machine 1 has a lease that ends at time X"), although other information may also be included in the lease without departing from the scope of the embodiments of the invention.

The attempting 85 proceeds substantially without user intervention, but may be terminated by providing, at 87, a manual override for manually terminating the attempting. The manual override 87 allows an administrator, or other executable application having control over the operation to terminate the attempting 85, such as if it is determined that the edge-connected bridgehead server 31 becomes security compromised and should not be performing the attempting 85. Where the manual override 87 is selected, the process of attempting 85 to establish an exclusive lease is not launched with respect to the suspect edge-connected bridgehead server 31. In another example, the attempting 85 is initiated at least one of periodically, when the configuration information on the trusted network 23 is updated, and when manually selected. Other conditions for initiating the attempting 85 may also be invoked without departing from the scope of embodiments of the invention.

Aspects of the invention further query, at 91, if the particular edge server 37 of interest has a current lease to another trusted server 51. If the edge server 37 does not have a current lease to another trusted server 51, then, at 85A, another edge server 37 is selected and operations return to the attempting 85 to establish the exclusive lease over communication with another one of the identified edge servers. The lack of a lease may indicate several things, including an edge server 37 not functioning properly, an edge server not yet placed online for use by the system, or an edge server manually removed from the system for maintenance. In any event, the lack of a lease is an indication to the system 21 to move to another edge server 37. Where the particular edge server 37 has a lease, another query, at 93, determines if the lease is expired. If the lease is not expired, then another edge server 37 is selected at 85A before returning to the attempting 85. Where the particular edge server 37 has an expired lease, a functioning edge server 37 without a current lease to another edge-connected bridgehead 51 is identified.

With an edge server 37 requiring a lease identified, the operations illustrated in the exemplary flow diagram 81 continue by updating, at 97, the currently-expired lease of the particular edge server 37 with a new lease to the trusted server 51. In one example, the updating 97 comprises deleting the currently-expired lease and replacing the currently-expired lease with a new lease to the trusted server 51.

When the trusted server 51 can establish the exclusive lease over communication with the edge server 37, aspects of the invention establish, at 99, communication between the trusted server and the one of the identified edge servers with the newly-established lease. With communication established, configuration information may be replicated, at 101, from the trusted network 23 to the edge server 37 having established communication with the trusted server 51. The replication 101 can occur periodically, or in response to manual selection by an administrator to replicate immediately. Such a manual selection can be used, for example, to replicate recently altered configuration information. In another example, the replicating 101 comprises replicating configuration information from a distributed directory service 33 administered within the trusted network 23 to a local directory service 39 used locally by the edge server 37 having established communication with the trusted server 51 within the perimeter network 25. In still another example, the replicating 101 configuration information comprises replicating changes to the configuration information (e.g., additions, deletions, and modifications), rather than all of the configuration information, from the trusted network 23 to the edge server 37 having established communication with the trusted server 51. Replicating only changes to the configuration information reduces the amount of information transferred.

Once a lease is established between the trusted server 51 and the edge server 37, replacement of the new lease with a second new lease may be triggered, at 103, before the new lease term expires. With overlapping leases, the established communication between the trusted server 51 and the edge server 37 may be maintained. But where the trusted server 51 is unable to maintain such a lease, due to maintenance, for example, aspects of the invention allow another trusted server 51 to readily establish a new lease for further communication once the lease expires. In still another example, a manual override, at 107, permits manually terminating the establishing communication 99 process.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above products and methods without departing from the scope of the invention, it is intended that all matter contained in the above description and shown in the accompanying drawings shall be interpreted as illustrative and not in a limiting sense.

What is claimed is:

1. A method of automatically establishing communication between a trusted network and a perimeter network outside the trusted network; said method comprising:
   identifying one or more edge servers residing in the perimeter network that are located on a same site as a trusted server residing in the trusted network;
   attempting, by the trusted server residing in the trusted network, to establish an exclusive lease over communication with one of the identified edge servers in the perimeter network, wherein said exclusive lease prevents other trusted servers residing in the trusted network from communicating with the identified edge server during a hold period for the exclusive lease, said exclusive lease reserving the right of the trusted server to communicate exclusively with the one of the identified edge servers;
   establishing communication between the trusted server and the one of the identified edge servers for the hold period when the trusted server can establish the exclusive lease over communication therewith; and
   in response to establishing communication with the trusted server, replicating server configuration information from the trusted network to the edge server.

2. A method as set forth in claim 1 further comprising:
   attempting, by the trusted server, to establish the exclusive lease over communication with another one of the identified edge servers when the trusted server cannot establish the exclusive lease over communication with the one of the identified edge servers with which the trusted server previously attempted to communicate; and
   establishing communication between the trusted server and the other one of the identified edge servers when the trusted server can establish the exclusive lease over communication therewith.

3. A method as set forth in claim 2 wherein said attempting comprises attempting, by the trusted server, to establish the exclusive lease over communication with another one of the identified edge servers when the one of the identified edge servers with which the trusted server previously attempted to communicate has at least one of a currently unexpired lease and no lease.

4. A method as set forth in claim 1 wherein said replicating comprises replicating configuration information from a distributed directory service administered within the trusted network to a local directory service used locally by the edge server having established communication with the trusted server within the perimeter network; and
   wherein said attempting to establish an exclusive lease over communication comprises attempting to establish an exclusive lease over communication at least one of periodically, when the configuration information on the trusted network is updated, and when manually selected.

5. A method as set forth in claim 1 wherein said replicating configuration information comprises replicating only changes to the configuration information from the trusted network to the edge server having established communication with the trusted server.

6. A method as set forth in claim 1 wherein said identifying comprises determining which of the edge servers are located in substantial physical proximity to the trusted server.

7. A method as set forth in claim 1 wherein said establishing communication between the trusted server and the one edge server further comprises determining that the one edge server has a current lease to another trusted server and determining that said current lease has expired; and wherein said establishing communication between the trusted server and the one edge server further comprises updating the currently-expired lease.

8. A method as set forth in claim 7 wherein said updating the currently-expired lease comprises deleting the currently-expired lease and replacing the currently-expired lease with a new lease to the trusted server.

9. A method as set forth in claim 8 further comprising replacing the new lease with a second new lease before the new lease term expires.

10. A system for automatically sending configuration information from a trusted network to a perimeter network outside the trusted network, said system comprising:
    one or more master servers residing in the trusted network, said master servers being adapted for administering a distributed directory service containing configuration information related to the trusted network;
    one or more edge servers residing in the perimeter network outside the trusted network, each of said edge servers adapted for locally using a local directory service; and
    one or more edge-connected bridgehead servers residing in the trusted network and adapted for establishing an exclusive lease over communication with the one or more master servers, wherein said one or more edge-connected bridgehead servers are adapted to automatically establish said exclusive lease over communication with one of the one or more edge servers residing in the perimeter network outside the trusted network during a hold period for the exclusive lease, said exclusive lease reserving the right of the one or more bridgehead servers to communicate exclusively with the one or more edge servers,
    wherein said one or more edge-connected bridgehead servers and said one or more edge servers are located on a same site, wherein said one or more edge-connected bridgehead servers and said one or more edge servers are located in substantial physical proximity to one another, said edge-connected bridgehead servers being adapted for replicating the configuration information from the distributed directory service administered by the one or more master servers within the trusted network to the local directory service used by each of the one or more edge servers within the perimeter network.

11. A system as set forth in claim 10 wherein each of the master servers being adapted for administering the distributed directory service contain the same configuration information related to the trusted network.

12. A system as set forth in claim 10 further comprising at least two sites, at least one of said sites comprising at least one edge server and at least one of the edge-connected bridgehead servers.

13. A system as set forth in claim 10 wherein said one or more edge servers are adapted for communicating with a network outside the perimeter network.

14. A system as set forth in claim 13 further comprising an exterior firewall separating the one or more edge servers on the perimeter network from the network outside the perimeter network.

15. A system as set forth in claim 10 further comprising an interior firewall separating the one or more master servers and the one or more edge-connected bridgehead servers residing in the trusted network from the one or more edge servers residing in the perimeter network and the network outside the perimeter network.

16. A method of automatically establishing communication between a trusted server residing in a trusted network and one or more edge servers residing in a perimeter network outside the trusted network; said method comprising:
    attempting, by the trusted server residing in the trusted network, to establish an exclusive lease over communication with the edge server in the perimeter network, wherein said exclusive lease prevents other trusted servers residing in the trusted network from communicating with the edge server during a hold period for the exclusive lease, said exclusive lease reserving the right of the trusted server to communicate exclusively with the edge server;
    establishing communication between the trusted server and the edge server when the trusted server can establish the exclusive lease over communication therewith;
    attempting, by the trusted server, to establish the exclusive lease over communication with another one of the edge servers when the trusted server cannot establish the exclusive lease over communication with the one edge server with which the trusted server previously attempted to communicate, said exclusive lease reserving the right of the trusted server to communicate exclusively with the one edge server; and
    establishing communication between the trusted server and the other one of the edge servers when the trusted server can establish the exclusive lease over communication therewith.

* * * * *